United States Patent
Shimizu et al.

(10) Patent No.: US 10,439,247 B2
(45) Date of Patent: Oct. 8, 2019

(54) FUEL CELL STACK

(71) Applicants: TOYOTA JIDOSHA KABUSHIKI KAISHA, Toyota-shi, Aichi-ken (JP); TAIHO KOGYO CO., LTD., Toyota-shi, Aichi-ken (JP); TOYODA GOSEI CO., LTD., Kiyosu-shi, Aichi-ken (JP)

(72) Inventors: Tatsuhiko Shimizu, Toyota (JP); Hitoshi Hamada, Gotenba (JP); Tatsuya Tokumasu, Toyota (JP); Tadanobu Ota, Kiyosu (JP); Yoshiki Nakamura, Kiyosu (JP)

(73) Assignees: Toyota Jidosha Kabushiki Kaisha, Toyota-shi, Aichi-ken (JP); Taiho Kogyo Co., Ltd., Toyota-shi, Aichi-ken (JP); Toyoda Gosei Co., Ltd., Kiyosu-shi, Aichi-ken (JP)

( * ) Notice: Subject to any disclaimer, the term of this patent is extended or adjusted under 35 U.S.C. 154(b) by 0 days.

(21) Appl. No.: 15/657,629

(22) Filed: Jul. 24, 2017

(65) Prior Publication Data
US 2018/0034091 A1 Feb. 1, 2018

(30) Foreign Application Priority Data
Jul. 26, 2016 (JP) .................................. 2016-145916

(51) Int. Cl.
*H01M 8/2483* (2016.01)
*H01M 8/04082* (2016.01)
(Continued)

(52) U.S. Cl.
CPC ..... *H01M 8/2483* (2016.02); *H01M 8/04201* (2013.01); *H01M 8/241* (2013.01);
(Continued)

(58) Field of Classification Search
None
See application file for complete search history.

(56) References Cited

U.S. PATENT DOCUMENTS 6,372,373 B1 * 4/2002 Gyoten ............... H01M 8/0254
429/461
6,720,103 B1 * 4/2004 Nagai ................. H01M 8/0273
429/463

(Continued)

FOREIGN PATENT DOCUMENTS

CN  1233081 A   10/1999
CN  101855763 A  10/2010
(Continued)

*Primary Examiner* — Carmen V Lyles-Irving
(74) *Attorney, Agent, or Firm* — Finnegan, Henderson, Farabow, Garrett & Dunner, LLP

(57) ABSTRACT

A fuel cell stack comprises a stacked body, an end plate and a case configured such that the stacked body is placed therein. The end plate is arranged to cover an end face of the stacked body in a stacking direction and an end face of the case in the stacking direction and is fastened to the end face of the case. A placement groove is formed in at least one surface out of two surfaces of the end plate and the case opposed to each other, such that a seal member is placed in the placement groove. The end plate includes a resin layer formed to continuously cover an inner circumferential wall surface of the fluid flow path hole, a surface of the end plate opposed to the stacked body, and an outer circumferential side end of the placement groove.

3 Claims, 4 Drawing Sheets

(51) Int. Cl.
*H01M 8/2475* (2016.01)
*H01M 8/241* (2016.01)
*H01M 8/2485* (2016.01)
*H01M 8/1018* (2016.01)

(52) U.S. Cl.
CPC ....... *H01M 8/2475* (2013.01); *H01M 8/2485* (2013.01); *H01M 2008/1095* (2013.01)

(56) References Cited

U.S. PATENT DOCUMENTS

2010/0248060 A1* 9/2010 Bono ................ H01M 8/04328
429/443
2016/0126563 A1* 5/2016 Hotta .................. H01M 8/0202
429/468

FOREIGN PATENT DOCUMENTS

| | | |
|---|---|---|
| CN | 105576166 A | 5/2016 |
| JP | 2006-147511 A | 6/2006 |
| JP | 2013-206855 A | 10/2013 |
| JP | 2015-8086 | 1/2015 |
| JP | 2015-158984 | 9/2015 |

* cited by examiner

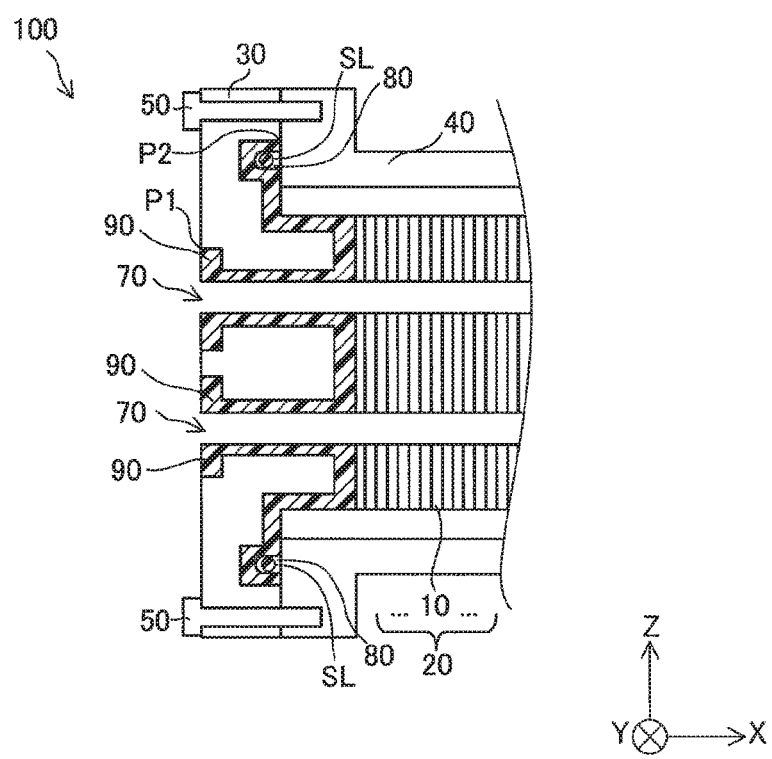

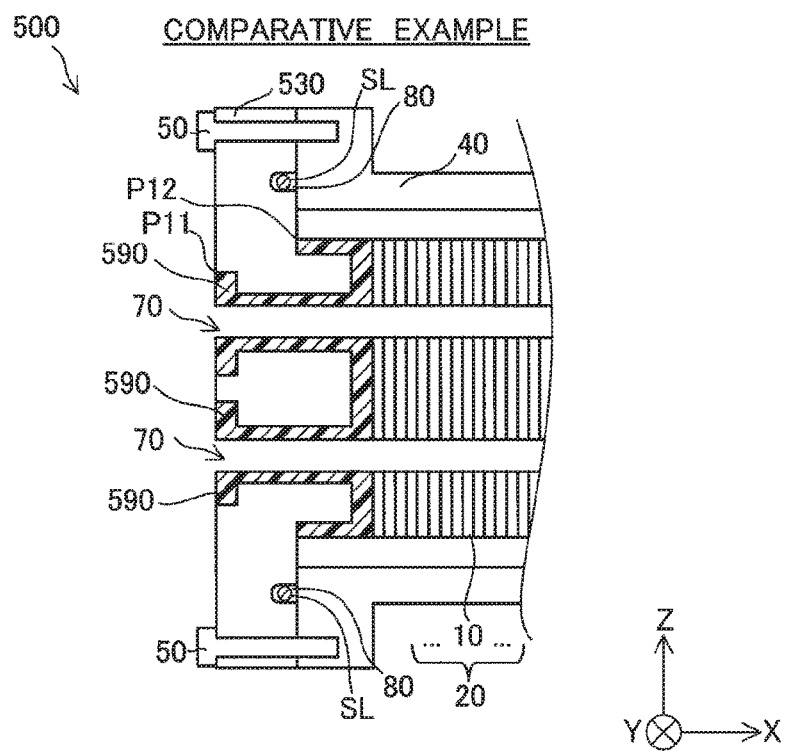

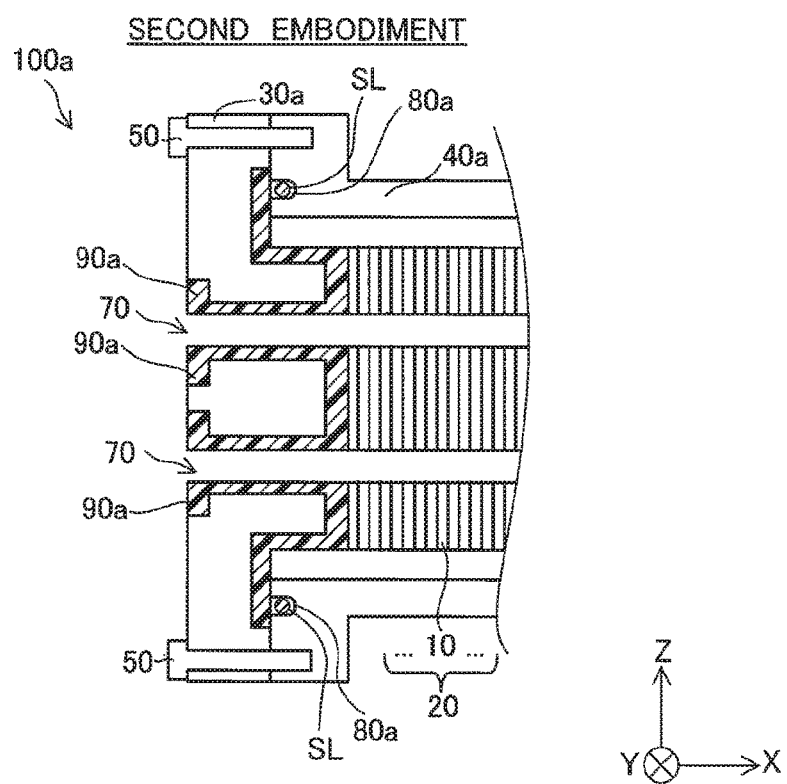

FUEL CELL STACK

CROSS-REFERENCE TO RELATED APPLICATIONS

The present application claims priority from Japanese patent application 2016-145916 filed on Jul. 26, 2016, the entirety of the disclosure of which is hereby incorporated by reference in its entirety.

BACKGROUND

Field

The present disclosure relates to a fuel cell stack.

Related Art

A plurality of manifolds are formed inside of a fuel cell stack configured such that a stacked body of a plurality of unit cells stacked in a stacking direction is placed between a pair of terminal plates and a pair of end plates provided on respective sides thereof, are arranged parallel to the stacking direction and are configured to supply reactive gases to the respective unit cells, discharge off gases from the respective unit cells, and supply and discharge a cooling medium to and from the respective unit cells. A plurality of through holes are formed in at least one of the end plates such as to communicate with the plurality of manifolds formed inside of the fuel cell stack. In general, the end plate is made of a metal such as an aluminum alloy. One proposed technique forms a resin layer to cover a contact surface between the end plate and the terminal plate and inner circumferential walls of the through holes formed in the end plate, with a view to suppressing reduction of the insulating property and the corrosion resistance due to, for example, any of the reactive gases and the cooling medium (as described in JP 2015-8086A).

According to a configuration of the fuel cell stack, the stacked body of the unit cells may be placed in a case. In this configuration, an end face of the entire case and an end face of the stacked body placed in the case are covered by an end plate, and the outer periphery of the case and the end plate are fastened to each other by means of bolts or the like. With a view to ensuring the air tightness and the water tightness at a contact surface between the end plate and the case, a seal member such as a gasket is placed on the contact surface between the end plate and the case.

A difference in coefficient of thermal expansion between the end plate and the resin layer formed to cover the inner circumferential walls of the through holes formed in the end plate and the like may cause a gap between the resin layer and the end plate in the course of repeated operations of the fuel cell stack. Water is thus likely to enter into the case from a non-sealed portion of the contact surface between the end plate and the case where the seal member is not placed, a non-covered portion of the end plate that is not covered by the resin layer, or an outer circumferential edge of the resin layer. There is accordingly a demand for a technique that suppresses water from entering into a case in a contact surface between an end plate and a case.

SUMMARY

According to one aspect of the disclosure, there is provided a fuel cell stack. This fuel cell stack comprises a stacked body configured to include a plurality of unit cells that are stacked; an end plate located outside of the stacked body in a stacking direction of the plurality of unit cells and configured to include a fluid flow path hole that is arranged to pass through in the stacking direction; and a case configured such that the stacked body is placed therein. The end plate is arranged to cover an end face of the stacked body in the stacking direction and an end face of the case in the stacking direction and is fastened to the end face of the case. A placement groove is formed in at least one surface out of two surfaces of the end plate and the case that are opposed to each other, such that a seal member used to seal the end plate and the case is placed in the placement groove. The end plate includes a resin layer formed to continuously cover an inner circumferential wall surface of the fluid flow path hole, a surface of the end plate opposed to the stacked body, and an outer circumferential side end of the placement groove.

BRIEF DESCRIPTION OF DRAWINGS

FIG. 2 is a sectional view illustrating closeup of the configuration of a first end plate;

FIG. 3 is a sectional view illustrating closeup of the configuration of a first end plate in a fuel cell stack according to a comparative example; and FIG. 4 is a sectional view illustrating closeup of the configuration of a first end plate in a fuel cell stack according to a second embodiment.

DETAILED DESCRIPTION

A. First Embodiment

A1. Configuration of Fuel Cell Stack

Figure 1:
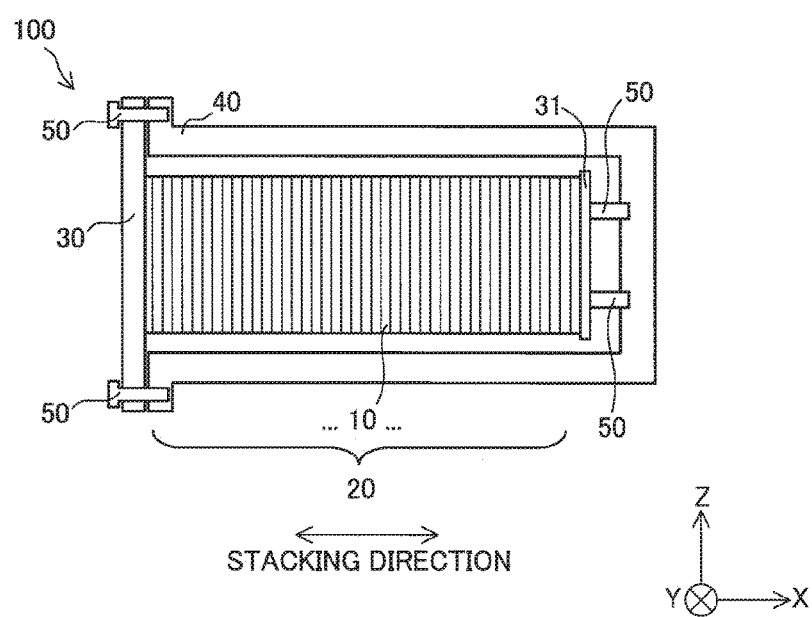
FIG. 1 is a sectional view illustrating the schematic configuration of a fuel cell stack according to one embodiment of the disclosure.

FIG. 1 is a sectional view illustrating the schematic configuration of a fuel cell stack 100 according to one embodiment of the disclosure. A cross section along a stacking direction of the fuel cell stack 100 is illustrated in FIG. 1. In FIG. 1, a Z axis is set parallel to a vertical direction, and an X axis and a Y axis are set parallel to a horizontal direction. A +Z direction corresponds to a vertically upward direction, and a −Z direction corresponds to a vertically downward direction. The stacking direction is parallel to the X axis.

The fuel cell stack 100 is configured to include a stacked body 20, a first end plate 30, a second end plate 31, a case 40 and a plurality of bolts 50. The stacked body 20 is configured to include a plurality of unit cells 10 stacked along the stacking direction. More specifically, the stacked body 20 includes the plurality of unit cells 10, terminal plates (not shown) and insulators (not shown). Each of the unit cells 10 is a polymer electrolyte fuel cell configured to generate electric power by an electrochemical reaction using reactive gases supplied to an anode-side catalytic electrode layer and a cathode-side catalytic electrode layer that are provided across a solid polymer electrolyte membrane. In each unit cell 10, a gas diffusion layer is formed from, for example, a carbon porous material such as carbon paper or carbon cloth and is placed outside of the catalytic electrode layer of each electrode side. A separator having electrical conductivity is further placed outside of the gas diffusion layer of each electrode side. A plurality of manifolds are formed inside of the fuel cell stack 10, are arranged parallel to the stacking direction, and are configured to supply the reactive gases to the respective unit cells 10, discharge off gases from the respective unit cells 10, and supply and discharge a cooling medium to and from the respective unit cells 10.

The first end plate 30 is placed outside (on a −X direction side) in the stacking direction of one end face out of two end faces of the stacked body 20 in the stacking direction. More specifically, a terminal plate (not shown) is placed adjacent to a −X-direction side end face of the unit cells 10, and the first end plate 30 is placed outside of this terminal plate in the stacking direction via an insulator (not shown).

The first end plate 30 is a plate-like member and is made of an aluminum alloy according to this embodiment. The first end plate 30 may, however, be made of any metal other than the aluminum alloy, for example, a titanium alloy or stainless steel. The first end plate 30 is formed in an approximately rectangular shape in a plan view and has an area that is larger than the area of the end face in a plan view of the stacked body 20 in the stacking direction. The stacked body 20 is placed between the first end plate 30 and the second end plate 31 under a predetermined pressure. The first end plate 30 and the case 40 are fastened to each other by means of the bolts 50, such that the stacked body 20 is maintained in the stacking state. The first end plate 30 includes a plurality of through holes that are formed to pass through in a thickness direction (stacking direction). The plurality of through holes serve as fluid flow path holes arranged to communicate with the plurality of manifolds formed inside of the stacked body 20. More specifically, the plurality of through holes serve as gas flow path holes or as fluid flow path holes 70 (described later) to supply the reactive gas or the cooling medium to the stacked body 20 and discharge the off gas or the cooling medium from the stacked body 20.

The second end plate 31 is placed outside (on a +X direction side) in the stacking direction of the other end face of the stacked body 20 that is opposite to the end face on which the first end plate 30 is placed, out of the two end faces of the stacked body 20 in the stacking direction. Like the first end plate 30 described above, a terminal plate (not shown) is placed adjacent to the other end face of the unit cells 10, and the second end plate 31 is placed outside of this terminal plate in the stacking direction via an insulator (not shown). The second end plate 31 is formed in a similar shape to that of the first end plate 30 and is formed from a similar material to that of the first end plate 30. The second end plate 31 is smaller than the first end plate 30 with respect to the dimension in the direction of the X axis.

The case 40 is formed in a tubular outer shape with an opening formed on a −X direction end thereof. The stacked body 20 and the second end plate 31 are placed inside of the case 40. As illustrated, the first end plate 30 is placed such that a +X-direction end face thereof covers a −X direction end face of the stacked body 20 and a −X direction end face of the case 40, and is fastened to the outer periphery of the case 40 by means of the bolts 50. The case 40 has high waterproof property, high dust resistance and high impact resistance and is made of an aluminum alloy according to this embodiment.

A2. Detailed Configuration of First End Plate 30

FIG. 2 is a sectional view illustrating closeup of the configuration of the first end plate 30. FIG. 2 illustrates closeup of the configuration of a −X direction end side of the fuel cell stack 100 shown in FIG. 1. The first end plate 30 includes fluid flow path holes 70, a placement groove 80, a seal member SL and a resin layer 90.

The fluid flow path holes 70 are through holes formed along the thickness direction of the first end plate 30 (stacking direction). As described above, the fluid flow path holes 70 are provided to communicate with the manifolds formed in the stacked body 20 and are used as the flow paths of the cooling medium.

The placement groove 80 is formed in a +X direction side face of the first end plate 30. More specifically, the placement groove 80 is formed at a location corresponding to the outer periphery of the case 40 in a surface of the first end plate 30 opposed to the case 40 when a +X direction surface of the first end plate 30 and a −X direction surface of the case 40 are fastened to each other. The seal member SL is placed in the placement groove 80. The seal member SL is used to seal the contact surface between the first end plate 30 and the case 40. The seal member SL serves to receive a fastening load applied in the fastened state of the fuel cell stack 100 and seal between the first end plate 30 and the case 40 by the surface pressure of the seal member SL. This configuration ensures the air tightness and the water tightness of the fuel cell stack 100. According to this embodiment, the seal member SL is made of a rubber. The rubber employed may be, for example, butyl rubber or silicone rubber.

The resin layer 90 is formed in the peripheries of the fluid flow path holes 70. The resin layer 90 serves to suppress reduction of the insulating property and the corrosion resistance due to the cooling medium. The resin layer 90 is formed to continuously cover three regions described below. As a first region, the resin layer 90 is formed to cover the inner circumferential wall surfaces of the fluid flow path holes 70. As a second region, the resin layer 90 is formed to cover a contact surface between a −X direction surface of the stacked body 20 and a +X direction surface of the first end plate 30 that are opposed to each other. As a third region, the resin layer 90 is formed to cover an outer circumferential side end of the placement groove 80 at a location where the +X direction surface of the first end plate 30 and the −X direction surface of the case 40 are opposed to each other. The resin layer 90 is also formed between these three regions. In other words, the resin layer 90 is formed to continuously cover the inner circumferential wall surfaces of the fluid flow path holes 70, the surface of the first end plate 30 opposed to the stacked body 20, and the outer circumferential side end of the placement groove 80. According to this embodiment, the resin layer 90 is made of an insulating polymer material, for example, a polyolefin such as polypropylene (PP), an engineering plastic such as polyamide (PA) or polyphenylene sulfide (PPS), an elastomer such as fluororubber or silicone rubber or a thermoset resin such as unsaturated polyester. Aromatic polyamide or polyphenylene sulfide (PPS) may be used as the preferable material. The resin layer 90 may be formed by placing a mold in a profile of the resin layer 90 on the first end plate 30 and injection molding the resin material. Forming the resin layer 90 in this manner causes the first end plate 30, the stacked body 20 and the case 40 to be tightly joined together.

As described above, the configuration of the resin layer 90 to continuously cover the inner circumferential wall surfaces of the fluid flow path holes 70, the surface of the first end plate 30 opposed to the stacked body 20, and the outer circumferential side end of the placement groove 80 suppresses water from entering into the case 40. More specifically, for example, it is assumed that water enters from an end P1 exposed on a −X direction end face of the first end plate 30 in the boundary between the first end plate 30 and the resin layer 90 and penetrates along the boundary between the first end plate 30 and the resin layer 90. In this case, water is likely to further enter to an end P2 exposed on a +X direction end face of the first end plate 30. The resin layer 90 is, however, formed to cover up to the outer circumferential side end of the placement groove 80, so that the end P2 is located on the opposite side that is opposite to the inside (internal space) of the case 40 across the placement groove 80 (seal member SL). This configuration accordingly causes the seal member SL to suppress the water reaching the end P2 from further entering into the case 40.

A3. Comparative Example

FIG. 3 is a sectional view illustrating closeup of the configuration of a first end plate 530 in a fuel cell stack 500 according to a comparative example. As shown in FIG. 3, in the first end plate 530 of the comparative example, a resin layer 590 is formed to continuously cover the inner circumferential wall surfaces of the fluid flow path holes 70 and a surface of the first end plate 530 opposed to the stacked body 20 but is not formed to continuously cover the outer circumferential side end of the placement groove 80. Accordingly water entering from an end P11 exposed on a −X direction end face of the first end plate 530 in the boundary between the first end plate 530 and the resin layer 590 is likely to further enter to an end P12 exposed on a +X direction end face of the first end plate 530. The end P12 is located on the inner circumferential side of the placement groove 80 (seal member SL) and on the inner circumferential side of the case 40. The water reaching the end P12 is thus likely to enter into the case 40.

As described above, in the fuel cell stack 100 of the first embodiment, the resin layer 90 is formed in the first end plate 30 to continuously cover the inner circumferential wall surfaces of the fluid flow path holes 70, the surface of the first end plate 30 opposed to the stacked body 20, and the outer circumferential side end of the placement groove 80. Even when a gap appears between the resin layer 90 and the first end plate 30 due to a difference in coefficient of thermal expansion and water enters into this gap, this configuration causes water to reach only the outer circumferential side end of the placement groove 80 and causes the seal member SL placed in the placement groove 80 to suppress water from further entering to the inner side of the placement groove 80. This configuration accordingly suppresses water from entering into the case 40 in the contact surface between the first end plate 30 and the case 40.

B. Second Embodiment

FIG. 4 is a sectional view illustrating closeup of the configuration of a first end plate 30*a* in a fuel cell stack 100*a* according to a second embodiment. The fuel cell stack 100*a* of the second embodiment differs from the fuel cell stack 100 of the first embodiment by a first end plate 30*a* provided in place of the first end plate 30, a case 40*a* provided in place of the case 40, a placement groove 80*a* provided in place of the placement groove 80 and a resin layer 90*a* provided in place of the resin layer 90. The other configuration of the fuel cell stack 100*a* of the second embodiment is identical with that of the fuel cell stack 100 of the first embodiment. The like components are expressed by the like reference signs, and their detailed description is omitted.

The first end plate 30*a* of the second embodiment differs from the first end plate 30 of the first embodiment by omission of the placement groove 80. The case 40*a* of the second embodiment differs from the case 40 of the first embodiment by addition of the placement groove 80*a*. The placement groove 80*a* of the second embodiment is formed in an outer circumferential edge of a −X direction surface of the case 40*a*. The position of the placement groove 80*a* along the Z axis is similar to the position of the placement groove 80 of the first embodiment. The resin layer 90*a* of the second embodiment is formed to continuously cover the inner circumferential wall surfaces of the fluid flow path holes 70, a surface of the first end plate 30*a* opposed to the stacked body 20, and a location corresponding to the outer circumference of the placement groove 80*a*. Accordingly the resin layer 90*a* is formed to cover up to the location corresponding to an outer circumferential side end of the placement groove 80*a*.

The fuel cell stack 100*a* of the second embodiment having the above configuration provides the similar advantageous effects to those of the fuel cell stack 100 of the first embodiment. Additionally, the profile of the resin layer 90*a* is not complicated. This does not need a complicated mold profile for the resin layer 90*a* and thereby reduces the manufacturing cost.

C. Modifications

C1. Modification 1

In each of the embodiments described above, the placement groove 80, 80*a* is formed in one surface out of the two surfaces of the first end plate 30, 30*a* and the case 40, 40*a* that are opposed to each other. The present disclosure is, however, not limited to this configuration. For example, the placement groove may be formed in both the two surfaces of the first end plate 30 and the case 40 that are opposed to each other. In this modification, the placement groove formed in the first end plate 30 and the placement groove formed in the case 40 may be arranged at different positions along the Z axis. In this case, the resin layer 90 is preferably formed to cover up to an outer circumferential side end of the placement groove located on the outer circumferential side out of the two placement grooves. The resin layer 90 may, however, be formed to cover up to an outer circumferential side end of the placement groove located on the inner circumferential side and not to cover the outer circumferential side end of the placement groove located on the outer circumferential side. Such modifications also provide similar advantageous effects to those of the above embodiments.

C2. Modification 2

In each of the embodiments described above, the fluid flow path holes 70 are used as the flow paths of the cooling medium. The present disclosure is, however, not limited to this configuration. For example, the fluid flow path holes 70 may be used as flow path holes of the reactive gas and the off gas. This modification also provides similar advantageous effects to those of the above embodiments.

The disclosure is not limited to any of the embodiments, the examples, and the modifications described above but may be implemented by a diversity of other configurations without departing from the scope of the disclosure. For example, the technical features of any of the embodiments, the examples and the modifications may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

According to one aspect of the disclosure, there is provided a fuel cell stack. This fuel cell stack comprises a stacked body configured to include a plurality of unit cells that are stacked; an end plate located outside of the stacked body in a stacking direction of the plurality of unit cells and configured to include a fluid flow path hole that is arranged to pass through in the stacking direction; and a case configured such that the stacked body is placed therein. The end plate is arranged to cover an end face of the stacked body in the stacking direction and an end face of the case in the stacking direction and is fastened to the end face of the case. A placement groove is formed in at least one surface out of two surfaces of the end plate and the case that are opposed to each other, such that a seal member used to seal the end plate and the case is placed in the placement groove. The end plate includes a resin layer formed to continuously cover an inner circumferential wall surface of the fluid flow path hole, a surface of the end plate opposed to the stacked body, and an outer circumferential side end of the placement groove.

In the fuel cell stack of this aspect, the resin layer is formed in the end plate to continuously cover the inner circumferential wall surface of the fluid flow path hole, the surface of the end plate opposed to the stacked body, and the outer circumferential side end of the placement groove. Even when a gap appears between the resin layer and the end plate due to a difference in coefficient of thermal expansion and water enters into this gap, this configuration causes water to reach only the outer circumferential side end of the placement groove and causes the seal member placed in the placement groove to suppress water from further entering to the inner side of the placement groove. This configuration accordingly suppresses water from entering into the case in the contact surface between the end plate and the case.

The disclosure may be implemented by any of various aspects other than the fuel cell stack described above, for example, a fuel cell system including the fuel cell stack or a vehicle equipped with the fuel cell system.

What is claimed is:

1. A fuel cell stack, comprising:
   a stacked body configured to include a plurality of unit cells that are stacked;
   an end plate located outside of the stacked body in a stacking direction of the plurality of unit cells and configured to include a fluid flow path hole that is arranged to pass through in the stacking direction; and
   a case configured such that the stacked body is placed therein, wherein
   the end plate is arranged to cover an end face of the stacked body in the stacking direction and an end face of the case in the stacking direction and is fastened to the end face of the case,
   a placement groove is formed in at least one surface out of two surfaces of the end plate and the case that are opposed to each other, such that a seal member used to seal the end plate and the case is placed in the placement groove,
   the end plate includes a resin layer formed to continuously cover an inner circumferential wall surface of the fluid flow path hole, a surface of the end plate opposed to the stacked body, and an outer circumferential side end of the placement groove, and
   the resin layer extends continuously between:
      a first resin layer portion covering the inner circumferential wall surface of the fluid flow path hole,
      a second resin layer portion covering the surface of the end plate opposed to the stacked body,
      a third resin layer portion covering the outer circumferential side end of the placement groove, and
      a fourth resin layer portion abutting the second resin layer portion and the third resin layer portion.

2. The fuel cell stack according to claim 1, wherein the resin layer is configured to cover an inner surface of the end plate that surrounds the fluid flow path hole.

3. The fuel cell stack according to claim 1, wherein the end plate and the resin layer are constructed of respective materials that differ from each other.

* * * * *